Patented Oct. 10, 1939

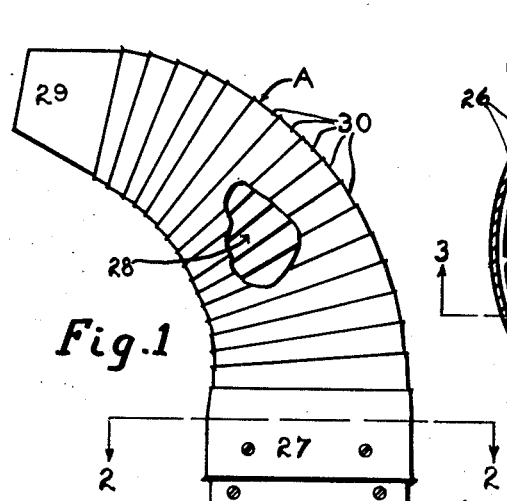
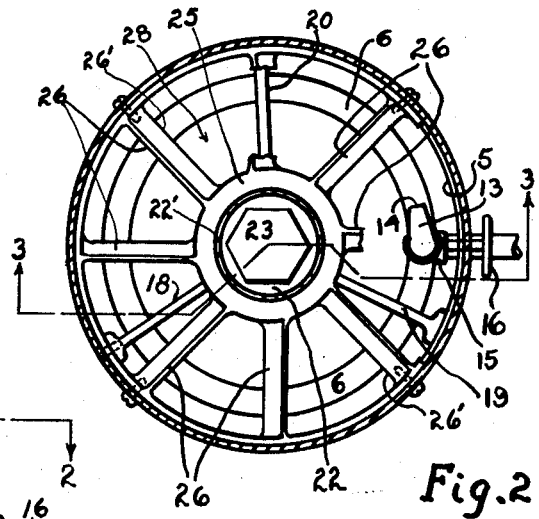
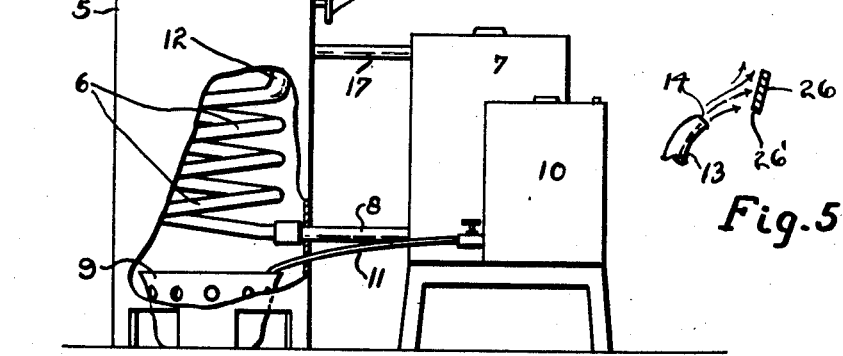
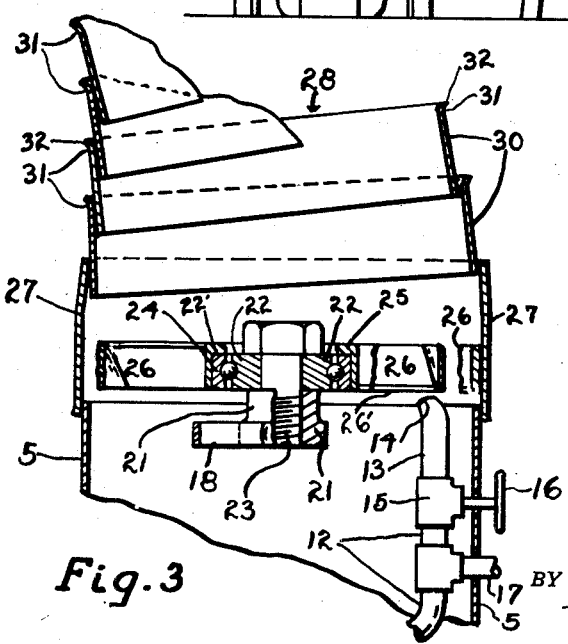
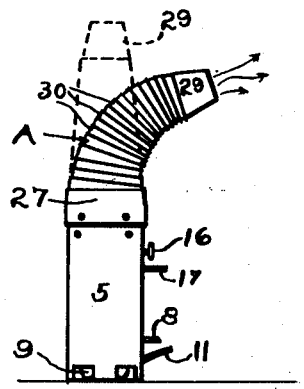
Oct. 10, 1939.   S. YOSHINAKA   2,175,422
APPARATUS FOR HEATING AND CIRCULATING STEAM FOR ORCHARDS AND GARDENS
Filed Aug. 9, 1938
INVENTOR.
S. YOSHINAKA
BY G. Ward Kemp
ATTORNEY.

2,175,422

UNITED STATES PATENT OFFICE 2,175,422

APPARATUS FOR HEATING AND CIRCULATING STEAM FOR ORCHARDS AND GARDENS

Seiichi Yoshinaka, Mesa, Wash.

Application August 9, 1938, Serial No. 223,888

2 Claims. (Cl. 47—2)

This invention relates to devices for generating steam, and particularly to apparatus for heating and mixing air and steam, to provide a fog, and for circulating such fog over orchards and gardens.

In the raising of fruit and vegetables, where cold weather and frosts occur, it is frequently necessary to provide artificial heat to prevent damage to such fruit and vegetation, from such cold.

Various attempts have been made to prevent such damages, by the use of heated air and dry vapors, but such practice has been inefficient, for various reasons. One of the objections to such former practice with such heated air vapors has been that they quickly rise when released, and this prevents the benefits from being obtained by the vegetation and trees near the earth. This is particularly true, where chilling winds flow beneath the heated air that may be released.

It is therefore an object of this invention to provide a simple and inexpensive device for heating steam and air and for combining the same together into a fog, and for distributing such fog over and among trees and plants to be protected.

It is a particular object to provide a standpipe with a water receptacle therein, and means for heating water and air adjacent thereto also a chamber for mixing such heated air and steam from such water together with a flexible hood and nozzle for distributing the combined air and steam, in various directions.

It is a still further object to provide a hood, a nozzle, over such standpipe with means for rotating the same, whereby such fog is circulated in various directions as desired.

With these and other objects to be hereinafter stated I have illustratively exemplified my invention by the accompanying drawing of which:

Figure 1 is a side elevation of the apparatus with a part broken away to show the interior.

Figure 2 is a top plan taken on line 2—2 of Fig. 1.

Figure 3 is a fragmentary side elevation, with parts in section, taken on line 3—3 of Fig. 2.

Figure 4 is a miniature side elevation with parts broken away and showing an alternate elevated position of the hood and nozzle in dotted lines.

Figure 5 is a fragmentary detail view of the jet and one of the vanes in cross section.

Like characters on the different figures represent like parts. Numeral 5 indicates a tubular standpipe in which is mounted a water coil 6, to which a supply of water is fed from a reservoir 7, through a pipe 8. Beneath the coil, an oil basin 9 is positioned to which a supply of fuel oil is fed from a tank 10 by pipe 11 for heating the oil and water therein to provide a suitable supply of steam. Above the coil is a discharge pipe 12, on the top of which is mounted a discharge jet 13, the tip thereof being bent or twisted upward and to one side for projecting steam therefrom in the desired direction. A regulator valve 15 is mounted in the pipe 12, provided with an ordinary hand wheel 16. A tube 17 connects the pipe 12 to the upper portion of the reservoir to prevent back pressure in the lower pipe 8.

Across the top of the standpipe are bracket arms as 18, 19, and 20, with a central boss 21 on which is mounted a central part 22 of an ordinary race block for balls 22'. The part 22 is attached to the boss by bolt 23. The outer and movable part of the block indicated as 24, is attached within a hub 25. A plurality of spokes or vanes 26 radially extend from the hub outward and are attached to a band or collar 27 which is rotatably mounted around the top of the standpipe. Said vanes are provided with flat sides obliquely disposed in relation to said jet with the lower edges thereof 26' sloping crosswise toward the jet.

In operation the steam is projected from the jet against such vanes whereby they are driven around, and the collar rotated therewith. The steam is also broken up by the rotating vanes and also commingled to form a fog with the air which has been heated in the coils beneath.

Above the collar and attached thereto is a chamber 28, within a cowl or hood, generally indicated as A, and wherein the steam and air are mixed and from which the mixture is expelled through a nozzle 29.

As it is important that such mixture be projected in various directions the walls of the hood are preferably semiflexible. For this purpose a series of tapered rings or bands 30 telescopically connect together and may be collapsed together for a small chamber or expanded outward and in various directions as indicated in full and in dotted lines in Fig. 4. Such bands are slidably fitted with sufficient friction to normally retain the various positions desired, but may be manually shifted as required. Each band is provided with a reduced neck 31, and flaring edges 32 at the smaller ends which prevent the bands from becoming accidentally disengaged from each other, but permit of sufficient movement to provide flexibility for disposition in the various directions required. When the hood and nozzle are disposed perpendicularly, the fog is discharged upward, but in general practice it is preferable to have the nozzle and hood turned substantially horizontal for discharging the fog horizontally, it being understood that the hood is rotated by the vanes and discharges the fog in various directions on the various levels desired.

Having described my invention I claim as new:

1. An apparatus for heating and distributing air and steam, comprising a standpipe, a water coil within said pipe, an oil burner beneath such coil, and means for feeding oil and water to said burner and coil respectively, a collar rotatably mounted upon said pipe, vanes supporting said collar, a jet attached to said coil in spaced relation from said vanes and adapted to discharge steam against the same for rotating said collar, a flexible hood connected over said collar for mixing steam and heated air, and a nozzle connected to the said hood for discharging said mixed steam and air in various directions, over trees and vegetables.

2. An apparatus for distributing heated air and steam over orchards and gardens, including a chamber for heating such steam and air, a hood rotatably mounted over said chamber and adapted to be rotated by such steam, a nozzle connected on the outer end of said hood, and the said hood provided with a plurality of tapered hoops telescopically connected together and adapted to be collapsed and also to be extended, and turned in various directions for discharging such heated air and steam in such various directions over orchards and gardens.

SEIICHI YOSHINAKA.